Patented Oct. 7, 1952

2,613,200

UNITED STATES PATENT OFFICE 2,613,200

DIKETONE ION-EXCHANGE RESINS

Charles H. McBurney, Philadelphia, Pa., assignor to Rohm & Haas Company, Philadelphia, Pa., a corporation of Delaware No Drawing. Application August 26, 1950, Serial No. 181,697

7 Claims. (Cl. 260—66)

This invention relates to a new ion-exchange material and to its process of preparation. More particularly it relates to a cation-exchange material which has as its polar group an enolizable 1,3-diketone grouping.

It is known that the essential structural requirements of an ion-exchange material are a complex macromolecular structure and polar groups. The complex macromolecular structure renders the ion-exchange material insoluble in aqueous media and the polar groups form the centers at which ion-exchange takes place. In the products that have heretofore been proposed as cation-exchange materials, the polar groups have either been derived from inorganic acids as in the case of the sulfonated phenol-formaldehyde condensates or from organic acids as in the case of the copolymers of acrylic or methacrylic acid and divinyl compounds. In such products the exhaustion and regeneration cycles are reversible reactions involving equilibrium relationships.

The object of this invention is to provide a cation-exchange material which because of its ability to form chelated structures shows unusual properties in the selective adsorption and elution of cations.

Such a material having an enolizable 1,3-diketone grouping is produced in accordance with this invention by reacting a methyl ketone with an acrylic ester-divinyl benzene copolymer whereby 1,3-diketone groups are introduced into the polymer through the reaction

wherein P represents the hydrocarbon nucleus of the polymer to which the carboxylic ester groups, —COOR, are attached and

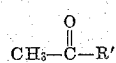

represents a methyl ketone. This reaction is carried out under anhydrous conditions in the presence of alkaline catalysts such as sodium alkoxides, sodamide, and sodium hydride.

The acrylic ester copolymer is preferably a copolymer of divinyl benzene and methyl acrylate or ethyl acrylate. These are the cheapest and most available acrylic esters but other acrylic esters, particularly other alkyl esters, may be used. The divinyl benzene component of the copolymer is used in an amount sufficient to produce an insoluble copolymer and to give good mechanical properties to the final product.

Amounts within the range of .5% to 10% by weight of divinyl benzene in the copolymer have given satisfactory results. The copolymer is preferably prepared in bead form by the suspension polymerization technique, a procedure well known in the art. This procedure has the advantage of producing the insoluble copolymer in the form of colorless, transparent spheres of good uniformity and of suitable size for ion-exchange purposes. Other methods of polymerization may be used followed, if necessary, by a grinding of the polymer to particles of appropriate size.

The particles of acrylic ester-divinyl benzene copolymer are insoluble and to obtain good reaction with the methyl ketone both the methyl ketone and catalyst should be liquid or a solid in solution. Acetone is the preferred methyl ketone, and it serves both as a reactant and as a swelling agent for the particles of copolymer. This swelling of the particles of copolymer in the reaction medium is highly desirable for it facilitates permeation of the particles by reactant and catalyst and results in more complete and more rapid reaction. Other methyl ketones such as methyl ethyl ketone and its higher homologues may be used but do not appear to have advantages over acetone. Sodium ethoxide, prepared by dissolving clean sodium metal in excess ethanol, provides a suitable liquid catalyst.

The condensation of the ketone with the acrylic ester-divinyl benzene copolymer is carried out at low temperatures whereby the competing reaction of the ketone with itself is minimized. Temperatures should be kept below 10° C. and preferably at 0°±5° C. A convenient method of carrying out the condensation is to prepare first the catalyst solution, then slowly add a portion of the ketone to the catalyst solution while cooling and stirring and finally add a mixture of the remaining ketone charge and the acrylic ester copolymer. All ingredients should be substantially anhydrous and care taken to exclude atmospheric water vapor. Stirring of the reaction mixture is continued to assure good heat-transfer to the cooling medium at least until substantial reaction of the ketone and copolymer has taken place. This may range from 3 to 12 hours. Stirring may then be discontinued and the reaction mixture allowed to remain under refrigerated conditions for whatever additional period is desired. The diketone resin is then filtered from the reaction mixture and washed, first with an organic solvent such as acetone, if desired, and then with water. As thus prepared, the resin is in the sodium enolate form. It is readily converted to the hydrogen or free diketone form by treatment with dilute mineral acid. Treatment with dilute sodium hydroxide restores it to the sodium form.

The following example illustrates the preparation of the diketone resin.

*Example 1*

1200 cc. of anhydrous ethyl alcohol was placed in a thoroughly dried, five-liter, three-necked flask equipped with an efficient reflux condenser, thermometer, and a crescent-shaped stirrer. A calcium chloride tube placed at the top of the condenser protected the reaction mixture from atmospheric water vapor. Sixty-two and one-tenth grams of sodium metal cut in strips was carefully added, care being taken to avoid too violent a reaction from taking place. At first the sodium dissolved very rapidly and the temperature rose eventually to the refluxing point. When most of the sodium had dissolved, the rate of reaction became much slower and the flask was heated to maintain refluxing until all of the sodium was dissolved. The resulting alcoholic solution of sodium ethoxide was cooled in an ice-salt bath and to it 1500 cc. of acetone was added at such a rate that the temperature did not rise above 10° C.

Three hundred grams of an ethyl acrylate-5% divinyl benzene copolymer, prepared in bead form by suspension polymerization and thoroughly dried at 70°–80° C., was placed in sufficient acetone to make a thin slurry and added to the mixture in the flask. Additional acetone sufficient to make a total of 2500 cc. was added and the whole charge was cooled to 0° C. and held at that temperature ±5° C. for three days with stirring. The reaction mixture was then filtered through a fine mesh screen and the resin washed thoroughly with a stream of cold water. The product consisted of clear, colorless, spherical beads which were much harder than the ethyl acrylate-5% divinyl benzene beads used as starting material. It had an exchange capacity of 4.15 milliequivalents per gram.

The diketone resin in the sodium form readily absorbs calcium ions which in turn may be readily exchanged for sodium ions by treating the resin with 5% sodium chloride solution. In this exchange cycle the diketone resin appears to act like the normal cation-exchange material. In the exchange of cupric ions, its action is quite different in that cupric ions are not removed from the resin by either dilute sodium chloride solutions or dilute acids but are readily removed by 0.1N potassium cyanide solution. The action of the resin in the adsorption of streptomycin is outstanding for the streptomycin will readily and essentially completely replace sodium from the resin so that upon regeneration with dilute acid a substantially ash-free streptomycin solution is obtained. The carboxylic acid type cation-exchange materials currently used for streptomycin recovery give a product containing a substantial amount of inorganic salt.

I claim:

1. A process for preparing resins which are capable of adsorbing cations and which contain enolizable groups having the formula

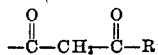

which comprises reacting under substantially anhydrous conditions and in the presence of an alkaline catalyst from the class consisting of sodium alkoxides, sodamide and sodium hydride (a) a copolymer of 0.5% to 10% divinylbenzene and 99.5% to 90% of an alkyl ester of acrylic acid with (b) a ketone having the formula CH$_3$—CO—R, the character R in both formulas being the same alkyl group.

2. A process for preparing resins which are capable of adsorbing cations and which contain enolizable groups having the formula

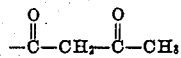

which comprises reacting under substantially anhydrous conditions and in the presence of an alkaline catalyst from the class consisting of sodium alkoxides, sodamide and sodium hydride (a) a copolymer of 0.5% to 10% divinylbenzene and 99.5% to 90% of ethyl acrylate with (b) acetone.

3. A process for preparing resins which are capable of adsorbing cations and which contain enolizable groups having the formula

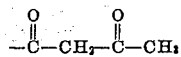

which comprises reacting under substantially anhydrous conditions and in the presence of sodium ethoxide (a) a copolymer of 0.5% to 10% divinylbenzene and 99.5% to 90% of methyl acrylate with (b) acetone.

4. A process for preparing resins which are capable of adsorbing cations and which contain enolizable groups having the formula

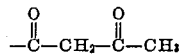

which comprises reacting under substantially anhydrous conditions and in the presence of sodium ethoxide (a) a copolymer of 0.5% to 10% divinylbenzene and 99.5% to 90% of ethyl acrylate with (b) acetone.

5. A cation-exchange resin which is the product of the process of claim 1.

6. A cation-exchange resin which is the product of the process of claim 2.

7. A cation-exchange resin which is the product of the process of claim 3.

CHARLES H. McBURNEY.

REFERENCES CITED

The following references are of record in the file of this patent:

UNITED STATES PATENTS

| Number | Name | Date |
|---|---|---|
| 2,363,297 | D'Alelio | Nov. 21, 1944 |

OTHER REFERENCES

Richter, Organic Chemistry, Spielmann Editor, 2nd Edition, vol. I, received 1925, page 350.